(12) United States Patent
Rubner et al.

(10) Patent No.: US 10,914,285 B2
(45) Date of Patent: Feb. 9, 2021

(54) SPAR CAP AND PRODUCTION METHOD

(71) Applicant: Wobben Properties GmbH, Aurich (DE)

(72) Inventors: Florian Rubner, Aurich (DE); Daniel Vinke, Aurich (DE)

(73) Assignee: Wobben Properties GmbH, Aurich (DE)

( * ) Notice: Subject to any disclaimer, the term of this patent is extended or adjusted under 35 U.S.C. 154(b) by 222 days.

(21) Appl. No.: 16/073,309

(22) PCT Filed: Jan. 26, 2017

(86) PCT No.: PCT/EP2017/051663
§ 371 (c)(1),
(2) Date: Jul. 26, 2018

(87) PCT Pub. No.: WO2017/129686
PCT Pub. Date: Aug. 3, 2017

(65) Prior Publication Data
US 2019/0032633 A1  Jan. 31, 2019

(30) Foreign Application Priority Data

Jan. 29, 2016 (DE) .......................... 10 2016 101 663
Oct. 12, 2016 (DE) .......................... 10 2016 219 873

(51) Int. Cl.
*F03D 1/06* (2006.01)
*F03D 80/30* (2016.01)
(Continued)

(52) U.S. Cl.
CPC ............ *F03D 1/0675* (2013.01); *B29C 70/08* (2013.01); *B32B 9/04* (2013.01); *B32B 13/02* (2013.01);
(Continued)

(58) Field of Classification Search
CPC ...................................................... F03D 80/30
See application file for complete search history.

(56) References Cited

U.S. PATENT DOCUMENTS 5,372,479 A    12/1994  Byrnes et al.
7,758,313 B2 *  7/2010  Eyb .......................... F03D 1/065
                                                                416/226
(Continued)

FOREIGN PATENT DOCUMENTS

CN    102661240 A    9/2012
CN    103817955 A    5/2014
(Continued)

*Primary Examiner* — Richard A Edgar
(74) *Attorney, Agent, or Firm* — Seed Intellectual Property Law Group LLP (57) ABSTRACT

A spar cap for a rotor blade of a wind power installation, having a longitudinal extent from a first end to a second end, a transverse extent orthogonal to the longitudinal extent, and a thickness orthogonal to the longitudinal extent and to the transverse extent. A method for producing a spar cap as mentioned at the outset. The spar cap has a longitudinal extent from a first end to a second end, a transverse extent orthogonal to the longitudinal extent, and a thickness orthogonal to the longitudinal extent and to the transverse extent, at least two tiers of a first fiber composite material, and at least one tier of a second fiber composite material, wherein the first fiber composite material has a matrix material and/or fibers which is/are different from that/those of the second fiber composite material, the second fiber composite material is disposed in a portion adjacent to the second end, in the direction of the thickness between the at least two tiers of the first fiber composite material, and the at least one tier of the second fiber composite material terminates ahead of the second end.

14 Claims, 7 Drawing Sheets

(51) Int. Cl.
- *B29C 70/08* (2006.01)
- *B32B 13/02* (2006.01)
- *B32B 9/04* (2006.01)
- *B29L 31/08* (2006.01)

(52) U.S. Cl.
CPC ........ *F03D 80/30* (2016.05); *B29L 2031/085* (2013.01); *F05B 2280/2001* (2013.01); *F05B 2280/2006* (2013.01); *Y02E 10/72* (2013.01)

(56) References Cited

U.S. PATENT DOCUMENTS

| | | | |
|---|---|---|---|
| 8,734,110 B2 * | 5/2014 | Kuroiwa | F03D 80/30 416/146 R |
| 8,980,152 B2 | 3/2015 | De Vita et al. | |
| 9,140,234 B2 | 9/2015 | Baucke et al. | |
| 10,107,257 B2 * | 10/2018 | Yarbrough | F03D 1/0675 |
| 2008/0069699 A1 | 3/2008 | Bech | |
| 2011/0135486 A1 | 6/2011 | Bendel | |
| 2011/0211971 A1 | 9/2011 | Bendel et al. | |
| 2013/0149154 A1 | 6/2013 | Kuroiwa et al. | |
| 2014/0271198 A1 * | 9/2014 | Liu | F03D 1/0675 416/132 B |
| 2016/0146185 A1 * | 5/2016 | Yarbrough | F03D 1/0675 416/230 |

FOREIGN PATENT DOCUMENTS

| | | |
|---|---|---|
| DE | 20206942 U1 | 8/2002 |
| DE | 102008007304 A1 | 8/2009 |
| DE | 102009047570 A1 | 6/2011 |
| DE | 102010002432 A1 | 9/2011 |
| DE | 102013100117 A1 | 7/2013 |
| DE | 102011003560 B4 | 8/2013 |
| EP | 2815861 A1 | 12/2014 |
| JP | S58-135379 A | 8/1983 |
| JP | 2014522217 A | 8/2014 |
| RU | 1822395 A3 | 6/1993 |
| RU | 1828000 A1 | 10/1995 |
| RU | 2126343 C1 | 2/1999 |
| RU | 2469854 C2 | 12/2012 |
| WO | 2013/084361 A1 | 6/2013 |

* cited by examiner

SPAR CAP AND PRODUCTION METHOD

BACKGROUND

Technical Field

The invention relates to a spar cap for a rotor blade of a wind power installation. The invention furthermore relates to a rotor blade of a wind power installation, having a spar cap as mentioned at the outset. The invention moreover relates to a wind power installation having a tower, a nacelle, and a rotor, characterized in that the rotor has at least one rotor blade having a spar cap as mentioned at the outset. The invention moreover relates to a method for producing a spar cap as mentioned at the outset.

Description of the Related Art

Spar caps of the type mentioned at the outset are, for example, components of rotor blades, preferably rotor blades of wind power installations, or of aircraft wings which are in particular configured so as to be reinforced in the longitudinal direction. A reinforcement of this type serves in particular for absorbing forces which run along a longitudinal extent, wherein the aforementioned longitudinal extent in the case of rotor blades of wind power installations runs from the root of the rotor blade to the tip of the rotor blade. Spar caps in general are designed in such a manner that said spar caps have a first and a second end. The spar cap moreover typically has a planar geometry which is formed by the longitudinal extent and by the transverse extent. A spar cap, in a manner orthogonal to the transverse extent and to the longitudinal extent, has a thickness.

Spar caps can be produced from or comprise various materials. It is currently in particular commonplace for spar caps to be produced from fiber-reinforced materials, preferably fiber-reinforced plastics materials, since the latter have a high rigidity with a comparatively low weight. Furthermore, the anisotropic property of the fiber-reinforced materials can be utilized in the production of a spar cap since a rigidity directed in the longitudinal direction can be provided in particular on account thereof. Glass-fiber reinforced plastics materials are currently often used, since the former represent a good compromise between a high rigidity and low costs.

A rotor blade of a wind power installation typically comprises inter alia an upper and a lower shell element. The shell elements by way of the external surfaces thereof form substantially the external geometry of the rotor blade. The rotor blade in most instances includes an upper shell element having a spar cap, and/or a lower shell element having a spar cap. The spar cap, or the spar caps, respectively, is/are typically disposed on an internal side of the shell elements. The spar cap herein is preferably disposed on top of or on an internal face of the shell element and/or is embedded in the shell element.

The requirements set for spar caps of the type mentioned at the outset are manifold. In order to fulfil their function of reinforcing the rotor blade in the longitudinal direction, the spar cap must have a comparatively high rigidity in particular in the direction of the longitudinal extent of said spar cap. In particular, said rigidity must be higher than the rigidity of the element surrounding the spar cap so as to fulfil the function as a longitudinal reinforcement. Nevertheless, the rotor blades of wind power installations, or the spar caps that are included in the rotor blades, respectively, must have a low weight despite the high rigidity requirements. A low weight of the rotor blades reduces the normal force on the hub of the nacelle, on the one hand, and the centrifugal forces on the hub and within the extent of the rotor blade, on the other hand.

There is a direct correlation between the mass of the material used and the costs in particular in the use of fiber-reinforced plastics materials. By virtue of the high costs of the fiber-reinforced plastics material it is desirable here for the volume of material used, or the mass of said material, respectively, to be minimized and to nevertheless achieve a high rigidity. A further requirement for the spar caps of the type mentioned at the outset is that said spar caps can be attached in the upper and/or the lower shell element of the rotor blade, and/or can be fastened to the shell elements.

Wind power installations, by way of the construction height thereof and the exposed locations are more at risk of being struck by lightning in the case of thunderstorms. The lightning strikes herein typically enter at the highest point of the wind power installation, said highest point typically being formed by the blade tip. The possibility of upward lightning which can also strike at other points of the wind power installation only exists in the case of very high installations. In the case of a lightning strike there is the risk of the lightning striking the supporting structure of the wind power installation. There is therefore the requirement for reducing the risk of a lightning strike.

By virtue of the complex vibration system of a wind power installation it is a further requirement for the spar cap that the latter can absorb dynamic forces and in particular has a good durability. This durability is inter alia important since the spar caps cannot be continuously monitored and more over the replacement of said spar caps cannot be carried out in a non-destructive manner.

Spar caps of the type mentioned at the outset have been well-known for a long time, in particular in the field of wind power installation construction and aircraft construction. By virtue of the increasing economic requirements set for wind power installations, the trend in the installations in terms of the hub height and of the rotor diameter becoming ever larger can be identified. The rotor diameter herein is directly correlated with the length of the individual rotor blades.

The increasing size of the wind power installations in turn leads to ever higher mechanical stresses of the individual components, inter alia of the components in the rotor blades. On account of the increasing length of the rotor blades the centrifugal, and thus also the individual forces within such components which absorb the longitudinal forces, become larger. By virtue of these increasing forces a trend in the spar caps that absorb longitudinal forces in individual regions being provided with a larger cross section orthogonal to the longitudinal direction in order for the rigidity to be increased can be identified. However, this increasing thickness is correlated with an increasing weight of the spar cap.

The risk of a lightning strike is significantly increased by virtue of the increasing hub height and of the longer rotor blades. One difficulty of the present spar caps, or of the rotor blades in which the spar caps are installed, respectively, lies in that said spar caps are prone to a lightning strike. Special measures in order to reduce the risk of a lightning strike and in order to increase the rigidity of the spar cap are often associated with high costs. The existing devices and methods offer various advantages, but further improvements are desirable.

The German patent and trademark office in the priority application of the present application has researched the following prior art: DE 10 2011 003 560 B4, DE 10 2008 007 304 A1, DE 10 2009 047 570 A1, DE 10 2010 002 432 A1, DE 10 2013 100 117 A1, DE 202 06 942 U1.

BRIEF SUMMARY

The invention relates to a spar cap for a rotor blade of a wind power installation, having a longitudinal extent from a first end to a second end, a transverse extent orthogonal to the longitudinal extent, and a thickness orthogonal to the longitudinal extent and to the transverse extent. The invention furthermore relates to a rotor blade of a wind power installation, having a spar cap as mentioned at the outset. The invention moreover relates to a wind power installation having a tower, a nacelle, and a rotor, characterized in that the rotor has at least one rotor blade having a spar cap as mentioned at the outset. The invention moreover relates to a method for producing a spar cap as mentioned at the outset.

Provided is a spar cap and a method for producing a spar cap. Provided is a spar cap and a method for producing a spar cap, which enable a more rigid configuration of the spar cap and thus also of the rotor blade. Provided is a rotor blade having a reduced risk of a lightning strike.

Provided is a spar cap for a rotor blade of a wind power installation, having a longitudinal extent from a first end to a second end, a transverse extent orthogonal to the longitudinal extent, and a thickness orthogonal to the longitudinal extent and to the transverse extent, at least two tiers of a first fiber composite material, and at least one tier of a second fiber composite material, wherein the first fiber composite material has a matrix material and/or fibers which is/are different from that/those of the second fiber composite material, the second fiber composite material is disposed in a portion adjacent to the second end, in the direction of the thickness between the at least two tiers of the first fiber composite material, and the at least one tier of the second fiber composite material terminates ahead of the second end.

The longitudinal extent from the first end to the second end is a longitudinal extent in a direction of the spar cap which corresponds to the longest expanse of the spar cap. The transverse extent extends in a direction orthogonal to the longitudinal extent and has a larger dimension than the thickness. This is associated with the concept that the spar cap is configured substantially as a planar element having a minor thickness. The planar extent of the spar cap is accordingly formed by the longitudinal extent and by the transverse extent.

The thickness of the spar cap runs in a direction which runs orthogonally to the above-described face and thus in an orthogonal direction in relation to the longitudinal direction and simultaneously in an orthogonal direction in relation to the transverse extent. In order to meet the special stresses of the spar cap, the dimension of the transverse extent and/or the dimension of the thickness along the longitudinal extent are/is varied. In particular the dimension of the thickness toward the second end, and/or toward the first end, is reduced herein. This is enabled in particular in that the level of elongation is reduced toward the tip of the rotor blade.

The spar cap comprises at least two tiers of a first fiber composite material. The tiers are to be understood substantially as layers of a material which have a planar geometry having a minor thickness. A tier herein is composed of at least two fibers that are disposed in a planar manner, and from the matrix material surrounding the fibers. The tiers of the fiber composite material are disposed so as to be substantially plane-parallel with the aforementioned planar expanse of the spar cap. The spar cap furthermore comprises at least one tier of a second fiber composite material, wherein the tiers of the second fiber composite material are likewise to be understood substantially as layers of a material which have a planar geometry having a minor thickness.

A spar cap having fiber composite tiers of this type can preferably be entirely rigid and not permit any flexing about any axis. A spar cap of this type is furthermore preferably elastic in a certain manner in relation to specific axes. For example, the spar cap by virtue of the large dimension of the longitudinal extent of said spar cap can be elastic in relation to an axis parallel with the transverse extent. An ideally minimal elasticity is to preferably be implemented in the longitudinal direction of the longitudinal extent, that is to say in relation to an axis parallel with the longitudinal extent.

The component parts of the first fiber composite material herein are different from the component parts of the second fiber composite material. Fiber composite materials of the type mentioned at the outset have substantially to main component parts. The main component parts are a matrix material and fibers, wherein the main component parts have mutual interactions in such a manner that the fiber composite material preferably has properties of a higher standard than either of the two individual participating main component parts. The fibers herein are embedded in the matrix material. The use of different component parts in the two fiber composite materials of the spar cap is based on the concept that the use of a plurality of materials is advantageous in terms of the properties to be achieved of the spar cap, since the specific characteristics of the material such as, for example, the rigidity, the specific weight, or the electric conductivity, can be utilized in a targeted manner.

The matrix material configures the matrix which hold the fibers in their position and transfer and distribute stresses between the fibers. Moreover, the matrix serves for protecting the fibers from external mechanical and chemical influences. The fibers increase the strength of the material, said strength depending on the fiber orientation in the matrix being either direction-independent (anisotropic) or direction-dependent (isotropic). The different component parts of the first fiber composite material and of the second fiber composite material relates substantially to the fibers and/or to the matrix material.

Different fibers herein means different or dissimilar, respectively, fibers in the sense of fiber types or fiber materials, respectively. The fibers of the first fiber composite material and/or of the second fiber composite material can comprise or be composed of dissimilar fiber types. Potential fiber types can be organic fibers, and/or inorganic fibers, and/or natural fibers. Inorganic fibers are, for example, glass fibers, basalt fibers, boron fibers, ceramic fibers, or steel fibers. Organic fibers are, for example, aramid fibers, carbon fibers, polyester fibers, and polyethylene fibers (in particular high performance polyethylene [HPPE] fibers such as, for example Dyneema fibers). Natural fibers are, for example, hemp fibers, flax fibers, or sisal fibers.

In one preferred variant of embodiment the first and/or the second fiber composite material comprises in each case exclusively a single fiber type. In a further preferred variant the fibers of the first fiber composite material and/or of the second fiber composite material comprise in each case two fiber types, for example organic fibers and inorganic fibers. In one particularly preferred variant of embodiment the first fiber composite material and/or the second fiber composite material comprise in each case more than two dissimilar fiber types.

An embodiment which is yet to be described in detail hereunder, in which the fibers of the first fiber composite material comprise or are electrically non-conductive fibers such as, for example glass fibers, and the fibers of the second fiber composite material comprise or are carbon fibers, is particularly preferable.

The fibers of the first and/or of the second fiber composite material can be disposed within the matrix material in the most varied manner. The fibers can be disposed within the matrix material as woven fabrics, and/or cross-laid structures, and/or multi-axial cross-laid structures, and/or embroidered fabrics, and/or a nonwoven material, and/or mats, and/or braided fabrics, and/or fiber bundles, preferably rovings.

This arrangement of the fibers determines inter alia the production process, in particular the economy of the production process, and the anisotropy of the fiber composite material. Depending on the requirements for the spar cap, a strong anisotropy and or else also a strong isotropy can be achieved by way of the arrangement of the fibers, such that the rigidity in the longitudinal direction, in the transverse direction, and also in the direction of the thickness, can be influenced by the orientation of the fibers that are contained in the fiber composite materials. Since it is a task of the spar cap to guarantee the absorption of forces in the longitudinal direction, anisotropic properties of the spar cap are to be preferably implemented. For this purpose, the fibers are embedded in the matrix material having an orientation in the longitudinal direction.

The second fiber composite material is disposed in a portion adjacent to the second end of the spar cap, in the direction of the thickness between the at least two tiers of the first fiber composite material. The tiers of the first fiber composite material and the tiers of the second fiber composite material are accordingly disposed so as to be substantially plane-parallel on top of one another. The spar cap is composed of at least three layers, wherein two external layers and at least one internal layer are present. A layer herein is composed of one or a plurality of tiers of the fiber composite material. The two external layers herein are composed of tiers of the first fiber composite material and, in the case of a total of three layers, the internal layer disposed between said external layers is composed of tiers of the second fiber composite material.

The thickness of the spar cap is formed by the tiers of the first fiber composite material that are disposed on top of one another so as to be plane-parallel, and by the tiers of the second fiber composite material that are disposed on top of one another so as to be plane-parallel. The thickness of the spar cap is therefore substantially linear in relation to the number of tiers of the first fiber composite material and in relation to the number of tiers of the second fiber composite material. The weight of the spar cap can be substantially influenced by the number of tiers, since the thickness in conjunction with the planar expanse, determined by the longitudinal extent and the transverse extent, and the specific weight of the fiber composite materials, determines the weight of the spar cap.

The internal layer which is composed of the second fiber composite material is disposed in a portion adjacent to the second end, such that the internal layer, or the portion having the internal layer, respectively, is spaced apart from the second end substantially in the longitudinal direction. The dimension of this spacing can preferably be 2%, furthermore preferably 5%, furthermore preferably 7.5%, furthermore preferably 10%, furthermore preferably 12.5%, furthermore preferably 15%, furthermore preferably 17.5%, furthermore preferably 20%, furthermore preferably more than 20% of the dimension of the longitudinal extent of the spar cap. This portion can further extend up to the first end of the spar cap. In a further preferred variant, this portion is likewise spaced apart from the first end of the spar cap.

Therefore, the at least one tier of the second fiber composite material terminates ahead of the second end of the spar cap. It is accordingly furthermore derived that the aforementioned portion having the second fiber composite material is at all times spaced apart from the second end. It is furthermore derived that the second end is formed substantially by tiers of the first fiber composite material. It is therefore a pre-requisite that at least one tier of the first fiber composite material is present at the second end of the spar cap.

In one preferred embodiment of the spar cap the number of tiers of the first fiber composite material is reduced toward the second end. This reduction in the tiers of the first fiber composite material toward the second end is advantageous in that the weight of the spar cap is significantly influenced by the number of tiers, and a reduction in tiers of this type can lead to a weight saving. The reduction in the tiers and the weight saving associated therewith is furthermore paired with a reduction in rigidity. Such a reduction in the number of tiers can also be referred to as a region of diminished or reduced coverage.

However, the reduction in the tiers of the first fiber composite material can be performed only to the extent that two external tiers, composed of the first fiber composite material, remain in the above mentioned region containing tiers of the first and of the second fiber composite material, in order for the tier or the tiers of the second fiber composite material to be disposed between these two external tiers of the first fiber composite material. The number of tiers of the first fiber composite material can be reduced to one in the region of the second end where no tiers of the second fiber composite material are disposed.

A reduction in the tiers of the first fiber composite material toward the second end is in particular advantageous since the required longitudinal rigidity of the spar cap decreases toward the second end by virtue of the centrifugal forces that are reduced toward the end of the rotor blade, and the weight saving that is thus achieved is not associated with any disadvantages in terms of the rigidity requirements.

In a further preferred embodiment of the spar cap said spar cap has at least two tiers of the second fiber composite material, wherein the number of tiers of the second fiber composite material is reduced toward the second end. This variant of embodiment takes into account the situation that also the tiers of the second fiber composite material influence the weight of the spar cap and thus can be reduced in portions of the spar cap having lower strength requirements.

A reduction in the tiers of the second fiber composite material toward the second end is in particular advantageous since the required longitudinal rigidity of the spar cap decreases toward the second end by virtue of the centrifugal forces that are reduced toward the tip of the rotor blade. A weight saving can be achieved in this way. At the same time, the reduction in the tiers of the second fiber composite material and/or the reduction in the tiers of the first fiber composite material toward the second end are/is preferably mutually adapted and/or adapted to the requirements prevailing at the respective location of the spar cap in such a manner that unfavorable rigidity jumps in the spar cap that are caused by the region of reduced coverage are reduced or avoided. This can be avoided or reduced in particular in that in the case of the reduction in the tiers of the first and of the second fiber composite material is not performed exactly at the same locations but in an offset manner.

A further preferred refinement of the spar cap provides that said spar cap comprises at least three or more tiers of the first fiber composite material and/or at least three or more tiers of the second fiber composite material. This variant of embodiment is applied in a majority of the applications of spar caps, since a multiplicity of fiber composite material tiers are typically required in order for the desired rigidity properties of a spar cap to be achieved.

In one particularly preferred variant of the spar cap, it is provided that the at least one tier of the second fiber composite material has two external, mutually opposite, sides which are in each case formed by a planar expanse of the tiers in the longitudinal and the transverse extent, wherein the same number of tiers of the first fiber composite material is disposed on both sides of the at least one tier of the second fiber composite material. The two external layers, composed of tiers of the first fiber composite material, in each case accordingly have the same number of tiers of the first fiber composite material.

According to a further preferred embodiment of the spar cap, it is provided that the fibers of the second fiber composite material comprises or are carbon fibers. Carbon-fiber-reinforced fiber composite materials have the particular advantage of a very high rigidity, wherein said carbon-fiber-reinforced fiber composite materials at the same time have an extremely low specific weight. The rigidity of the carbon-fiber-reinforced fiber composite material is in particular capable of being set so as to be heavily anisotropic, and can thus increase the rigidity in the longitudinal direction of the spar cap in a targeted manner. The rigidity in the longitudinal direction is furthermore advantageously influenced when continuous fibers are used.

The carbon fibers herein can be embedded in dissimilar matrix materials, wherein the application of thermoplastic or thermosetting matrix materials is particularly advantageous when fiber-reinforced plastics materials are used. Carbon-fiber-reinforced plastics material is furthermore distinguished by good damping properties, a high impact strength in conjunction with a thermal expansion that can be set in a targeted manner. Furthermore, carbon-fiber-reinforced plastics material is distinguished by a highly increased electrical and thermal conductivity as compared to glass-fiber-reinforced plastics material.

The risk of a lightning strike in or on the rotor blade, respectively, is increased by electrically conductive materials. The particular advantage of the carbon-fiber-reinforced plastics material in terms of rigidity and of the specific weight is limited by this concept, since the risk of a lightning strike by virtue of the high electrical conductivity of the carbon-fiber-reinforced plastics material explained above is increased by the use of the latter. The increased risk of a lightning strike in the use of carbon-fiber-reinforced plastics material in the spar cap can be reduced when the carbon-fiber-reinforced plastics material is surrounded by a material that is not electrically conductive or less electrically conductive. The risk of a flashover of the lightning in the course of the internal discharge to the rotor blade flange can furthermore be minimized herein.

The concept of the advantage of a region of reduced coverage of the electrical conductive material furthermore can be traced back to the afore-described concept in relation to electrically conductive materials in or on the rotor blade, respectively, and to the risk of a lightning strike associated therewith. Therefore, the afore-described spacing of the second fiber composite material from the second end of the spar cap is a further solution in order for the risk of a lightning strike to be reduced.

In the case of a further preferred variant of embodiment it is provided that the fibers of the first fiber composite material comprise or are inorganic fibers, in particular electrically non-conductive fibers such as, for example glass fibers. Inorganic fibers typically offer the advantage that said inorganic fibers, despite the positive material properties thereof, cause only minor material costs, and that the processing can likewise be carried out in a cost-effective manner. This applies in particular in a direct comparison with carbon-fiber-reinforced plastics materials. Besides glass fibers, preferred inorganic fibers are inter alia basalt fibers, boron fibers, or ceramic fibers. Glass fibers are particularly preferably used as fibers in fiber-reinforced plastics materials, wherein thermosetting or thermoplastic matrix materials are largely used here.

The use of electrically non-conductive materials in spar caps offers several advantages. These advantages manifest themselves, for example, in that the risk of a lightning strike is reduced in the use of non-conductive spar cap materials. There is the possibility of using an electrically conductive and an electrically non-conductive material or a material that is electrically slightly conductive in the use of two spar cap materials. In the case of the electrically non-conductive material, or the material that is barely electrically conductive, substantially surrounding the electrically conductive material, there is the possibility for the conductive material to be completely or largely insulated and the risk of a lightning strike to thus be reduced.

In a further variant of embodiment of the spar cap, it is provided that the matrix material of the first fiber composite material and/or of the second fiber composite material comprises or is composed of plastics material, and the plastics material preferably comprises or is composed of a thermoplastic and/or a thermosetting material, and/or that the matrix material of the first fiber composite material and/or of the second fiber composite material comprises or is composed of cement, and/or comprises or is composed of concrete, and/or comprises or is composed of ceramic.

A plastics material matrix from a thermoplastic matrix material has the advantage that the spar cap generated can still be formed and/or welded. The cause therefore lies in particular in that the thermoplastic matrix material can be fused multiple times. This can be advantageous in the fastening of the spar cap in the cavity of the rotor blade. Spar caps which have a thermosetting material as the matrix material, or are composed of said thermosetting material, by contrast are distinguished by a particularly high strength. It is disadvantageous in a thermosetting matrix material that said thermosetting matrix material after curing can be further processed only with difficulty and renewed fusing is not possible.

The use of cement, concrete, metal, ceramic, and/or carbon enables the specific advantages of the materials mentioned to be utilized, said specific advantages relating in particular but not exclusively to the rigidity of said materials in terms of tensile and/or compressive forces, of the specific weight of said materials, of the electrical and/or thermal conductivity of said materials, and/or of the processing capability of said materials.

In the case of the spar cap, there is the possibility for the first fiber composite material to have a matrix material that is different from that of the second fiber composite material. There is the possibility, for example, for the first fiber composite material to comprise a thermoplastic matrix material so as to utilize the advantages of said material in terms of elasticity and processing capability. There is furthermore the possibility for the second fiber composite material to comprise a thermosetting matrix material so as to utilize the possibility of a high strength on account of this material. Matrices from plastics material and/or ceramic in the present field of application offer the particular advantage that these are electrically non-conductive materials, or materials that are only slightly conductive, respectively, such that the risk of a lightning strike can be reduced when these matrix materials are used in particular for the first fiber composite material.

In a further particularly preferred variant of embodiment of the spar cap, it is provided that the tiers of the first fiber composite material and of the second fiber composite material are disposed between two external tiers of the first fiber composite material. It is provided in this variant of embodiment that tiers of the first fiber composite material and of the second fiber composite material can be disposed so as to be mixed on top of one another between the external fiber composite material tiers of the first fiber composite materials.

Accordingly, more than the two layers, composed of one or a plurality of tiers of the first fiber composite material, and the one layer, composed of one or a plurality of tiers of the second fiber composite material, are disposed in this variant of embodiment. A multiplicity of layers, composed of tiers of the first fiber composite material and tiers of the second fiber composite material can be disposed between the two external layers composed of tiers of the first fiber composite material. The two dissimilar materials here are accordingly mixed in a layer-by-layer manner. The first and the second fiber composite material preferably have the same matrix material.

An arrangement of this type is advantageous in that rigidity jumps in the spar cap can be reduced and therefore no stress peaks, or weaker stress peaks, are present. The provision of two external tiers of the first composite material is necessary in that these tiers assume specific technical tasks. Reference has to be made here in particular to the requirement that the spar cap has to be attached in the rotor blade and the first fiber composite material thus is to be connected, preferably in a materially integral manner, to a further material. Moreover, the advantage already mentioned of the first fiber composite material being composed of a non-conductive material which insulates the second fiber composite material, the risk of a lightning strike thus being able to be reduced, is capable of being implemented here.

One preferred variant of embodiment furthermore provides that the fibers of the first fiber composite material and/or of the second fiber composite material run so as to be substantially parallel with the direction of the longitudinal extent. A fiber orientation of this type results in the tensile rigidity of the spar cap in the longitudinal direction being maximized in particular.

In terms of further advantages, variants of embodiment, and details of embodiments of the spar cap according to the invention and of the refinements thereof reference is also made to the description hereunder pertaining to the features of the associated production method.

According to a further aspect of the invention, the object mentioned at the outset is achieved by a rotor blade of a wind power installation, having a spar cap as described above, and/or an electrically conductive foil/film tier, and a lightning interception installation of a lightning protection system, wherein the electrically conductive foil/film tier is connected to the lightning interception installation by way of an electrically conductive connection.

The provision of a spar cap according to the invention in a rotor blade of a wind power installation is advantageous in terms of various concerns. In particular, a rotor blade of this type is distinguished by a low weight and optionally by a higher rigidity. Furthermore, the possibility of reducing the risk of a lightning strike exists when selecting the respective fiber composite materials. This can be implemented in particular when a material which has a low electrical conductivity is utilized for a first fiber composite material.

The provision of a foil/film tier that is connected in an electrically conductive manner to the lightning interception installation, for example a receptor, which is likewise electrically conductive, has the advantage that the interception face of the lightning interception installation can be significantly enlarged on account thereof, and the risk of lightning strikes in this region, for example in the cap of the rotor blade, and/or of damage to the rotor blade caused thereby can be significantly reduced.

In a further preferred design embodiment of the rotor blade it is provided that the foil/film tier has an extent in the direction of a longitudinal extent of the rotor blade said extent preferably being at most $\frac{1}{5}$, in particular at most $\frac{1}{10}$, or at most $\frac{1}{20}$, or at most $\frac{1}{50}$, of the longitudinal extent of the rotor blade. The foil/film tier thus preferably does not extend across the entire longitudinal extent of the rotor blade, also not across a majority of the longitudinal extent of the rotor blade, but only across a comparatively small region.

It is furthermore preferable that the foil/film tier covers a region in the direction of a longitudinal extent of the rotor blade in which the at least one tier of the second fiber composite material of the spar cap terminates. In particular in the case of an arrangement in which the foil/film tier covers the region in which the at least one tier of the second fiber composite material terminates, the risk of lightning strikes, for example in the spar cap, can be further reduced in this region.

A further preferred design embodiment provides that the foil/film tier is disposed in an external half of a thickness of a rotor blade wall that is measured transversely longitudinal direction of the rotor blade, in particular in an external third, or an external quarter, or an external tenth, or an external fiftieth, or an external hundredth. An arrangement of the foil/film tier as far outside as possible (in a direction transverse to the longitudinal extent of the rotor blade) on the rotor blade surface is preferable for a particularly efficient effect of the foil/film tier.

It can preferably be provided that the foil/film tier is disposed on one or a plurality of tiers of fiber composite material which does/do not have any structural properties that are relevant to the layout design of the rotor blade. This design embodiment is particularly preferred so as to not compromise any tiers of fiber composite material that are relevant to the load-bearing capability of the rotor blade in the case of damage, for example damage to fiber composite material by an arc of lightning, but ideally for only the additionally provided tiers of fiber composite material on which the foil/film tier is disposed.

It is furthermore preferred that the foil/film tier is disposed and configured for resisting an expected lightning current load. The expected lightning current load can in particular be an expected mean lightning current load. Should the foil/film tier and/or the one or plurality of tiers of fiber composite material on which the foil/film tier is disposed, not or not fully withstand in particular a lightning current load that exceeds the expected lightning current load, a repair and/or a replacement of the film/foil tier and/or of the one or plurality of tiers of fiber composite material on which the film/foil tier is disposed can be provided.

A further preferred design embodiment provides that the foil/film tier has a plurality of clearances and/or meshes which are preferably disposed in a regular pattern. For example, the clearances and/or meshes can be configured so as to be diamond-shaped and/or rectangular and/or square and/or round and/or oval and/or polygonal. The webs between the clearances and/or meshes preferably have a thickness of 0.3 mm and a width of 0.5 mm. The clearances and/or meshes preferably have a length of 3.5 mm and a width of 2.5 mm.

The film/foil tier is preferably composed of aluminum or copper, or has alloys of aluminum or copper.

According to a further aspect of the invention, a wind power installation having a tower, a nacelle, and a rotor, characterized in that the rotor has at least one rotor blade having a spar cap as described above, and/or has at least one rotor blade as described above is provided. Besides the advantages already mentioned, a wind power installation comprising a spar cap according to the invention is advantageous in that said wind power installation can be provided with a higher hub height and a larger rotor span. Moreover, the overall costs of a wind power installation can be reduced by providing a spar cap according to the invention. The provision of an electrically conductive foil/film tier can significantly reduce the risk of a lightning strike and/or of damage caused on account thereof.

According to a further aspect of the invention, a method for producing a spar cap having a longitudinal extent from a first end to a second end, a transverse extent orthogonal to the longitudinal extent, and a thickness orthogonal to the longitudinal extent and to the transverse extent, the method comprising the steps of laying up at least two tiers of a first fiber composite material, laying up at least one tier of a second fiber composite material in such a manner that the second fiber composite material is disposed in a portion adjacent to the second end, in the direction of the thickness between at least two tiers of the first fiber composite material, and the at least one tier of the second fiber composite material terminates ahead of the second end, wherein the first fiber composite material has a matrix material and/or fibers which is/are different from that/those of the second fiber composite material.

Laying up the tiers of the first and/or the second fiber composite material is performed in such a manner that the planar sides of said tiers are in each case disposed so as to be largely plane-parallel on top of one another. Laying up is furthermore performed in such a manner that the tiers of the second fiber composite material are laid out between the tiers of the first fiber composite material. Furthermore, preferably in each case the same number of tiers of the first fiber composite material are disposed on the two external, mutually opposite, tiers of the second fiber composite material.

The tiers of the first fiber composite material and the tiers of the second fiber composite material at the second end of the spar cap are laid up in such a manner that the tiers of the first fiber composite material reach up to the second end, and the tiers of the first fiber composite material terminates already ahead of the second end. The second end is therefore preferably produced exclusively by tiers of the first fiber composite material.

The method for producing the spar cap is furthermore carried out by utilizing a first fiber composite material and a second fiber composite material, wherein the first fiber composite material is a different material than that of the second fiber composite material. This diversity manifests itself in particular in the fibers used and/or the matrix material used. A material that is only slightly electrically conductive, or is electrically non-conductive is preferably used for the first fiber composite material. A material which in particular has a very high rigidity is furthermore preferably used for the second fiber composite material.

Laying up the tiers of the fiber composite materials can be performed in different ways, for example, the fiber winding technology, the autoclave pressing technology, or the manual laminating method is applied. Depending on the fiber chosen and/or of the matrix material chosen, even further production steps can follow at the end of the production process set forth above. These steps can comprise, for example, the curing of a matrix material and/or the compression of the fiber composite material.

One preferred refinement of the production method explained above provides that the number of tiers of the first fiber composite material is reduced toward the second end, wherein the reduction in tiers is performed either continuously or at defined spacings. The number of tiers of the first fiber composite material that are disposed on top of one another is substantially reduced herein such that two layers, composed of tiers of the first fiber composite material and disposed on the outermost faces of the second fiber composite material, toward the second end have a dimension that decreases in the direction of the thickness.

The thickness of the spar cap along the longitudinal direction is reduced on account of this production step. A very homogenous transition of the individual tiers can be generally guaranteed by way of the very minor thickness of the individual tiers, such that the spar cap can have a consistent geometry.

One preferred embodiment of the production method provides that at least two tiers of the second fiber composite material are laid up in such a manner that the number of tiers of the second fiber composite material is reduced toward the second end. The specific stress situations along the longitudinal extent of the spar cap are also taken into account here by virtue of the reduced number of tiers of the second fiber composite material. It is to be observed in the laying up of the tiers of the second fiber composite material that the tiers of the second fiber composite material are not laid up toward the second end but that laying up is terminated already ahead of the second end. It is ensured on account of this type of laying up that the second fiber composite material does not reach up to the second end and the second end is thus formed substantially exclusively by the tiers of the first fiber composite material.

The production method according to the invention, and the refinements thereof, have features which render said production method particularly suitable for producing a spar cap according to the invention and the refinements thereof. In terms of the advantages, variants of embodiment, and details of embodiments of the production method, reference is therefore also made to the preceding description pertaining to the respective device features of the spar cap and of the refinements of the latter.

According to a further aspect of the invention a method for producing a rotor blade as described above, the method comprising incorporating a spar cap as described above; and/or incorporating an electrically conductive foil/film tier, and connecting the foil/film tier to a lightning interception installation of a lightning protection system by way of an electrically conductive connection.

In terms of the advantages, variants of embodiment, and details of embodiments of the production method for a rotor blade reference is also made to the preceding description pertaining to respective features of the other aspects.

BRIEF DESCRIPTION OF THE SEVERAL VIEWS OF THE DRAWINGS

Preferred embodiments of the invention will be explained in an exemplary manner by means of the appended figures in which.

DETAILED DESCRIPTION

Figure 1:
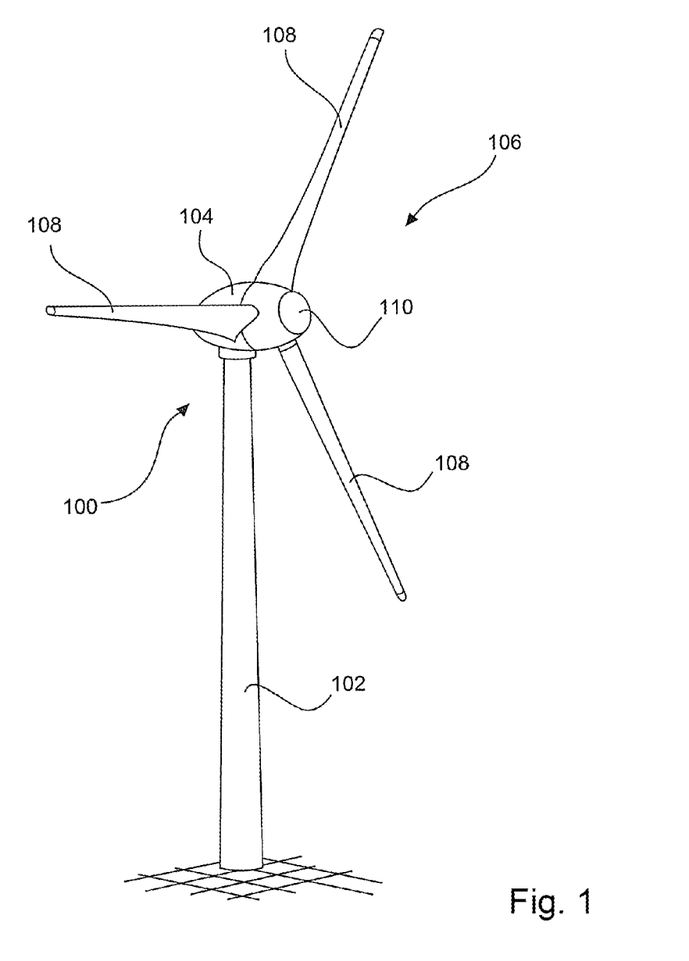
FIG. 1: shows a schematic illustration of a wind power installation.

FIG. 1 shows a schematic illustration of a wind power installation. FIG. 1 shows a wind power installation 100 having a tower 102 and a nacelle 104. A rotor 106 having three rotor blades 108 and a spinner 110 is disposed on the nacelle 104. The rotor 106 in operation is set in rotary motion by the wind and on account thereof drives a generator in the nacelle 104.

Spar caps 200 according to the invention are used in particular for the longitudinal reinforcement of the rotor blades 108. For this purpose, at least one spar cap 200, preferably two spar caps 200, are disposed in the interior of the rotor blade 108 and are preferably fastened to a side facing the interior of the rotor blade 108.

Figure 2:
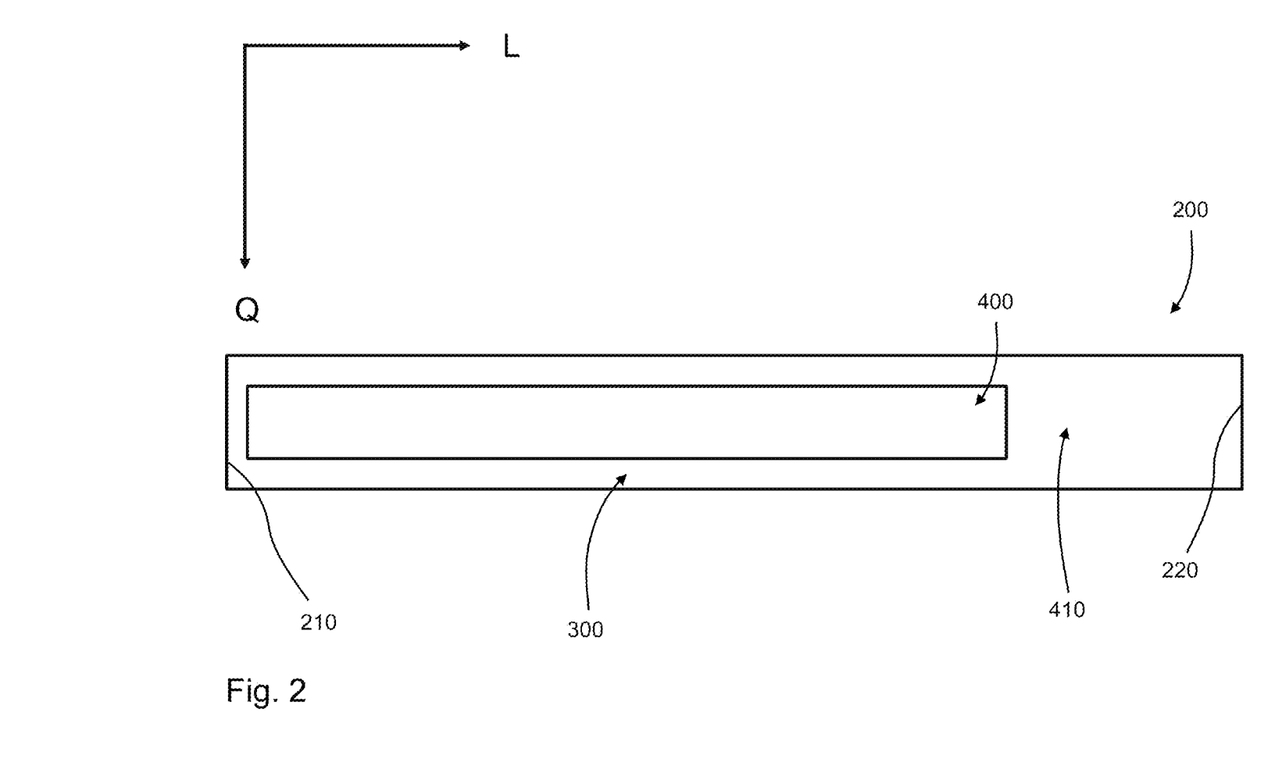
FIG. 2: shows a schematic cross-sectional view of a spar cap in the direction of a longitudinal and transverse extent thereof.

FIG. 2 shows a schematic cross-sectional view in the direction of a longitudinal extent L and transverse extent Q of a spar cap 200. The spar cap extends longitudinally along the longitudinal extent L thereof from a first end 210 to a second end 220. The first end 210 preferably represents the end of the spar cap 200, said end being disposed in the region of a rotor blade root. By contrast, the second end 220 represents that end of the spar cap 200 that is disposed in the region of a rotor blade tip. The dimension of the transverse extent Q can decrease in portions along the longitudinal extent L toward the second end 220. The reduction in the dimension of the transverse extent Q can alternatively also be preferably performed in a continuous manner.

The spar cap 200 is produced substantially from fiber composite materials which are processed in the form of so-called tiers and in this form are also present in the spar cap 200 produced. A tier comprises substantially fibers and a matrix material, wherein a tier is in particular configured as a layer. This means that a tier has a planar geometry having a minor thickness. The planar geometry of the tiers is in particular configured by a face in the direction of the longitudinal extent L and the transverse extent Q.

Therefore, the tier, or the tiers, respectively, of a first fiber composite material 300, and the tier, or the tiers, respectively, of a second fiber composite material 400 are depicted in FIG. 2, FIG. 3, FIG. 4, and FIG. 5. The tiers of the first fiber composite material 300 comprise or are preferably glass fibers, and the tiers of the second fiber composite material 400 comprise or are preferably carbon fibers.

A tier of the first fiber composite material 300 and a tier of the second fiber composite material are substantially depicted in FIG. 2. The tiers of the first fiber composite material 300 enclose largely the tiers of the second fiber composite material 400 in the direction of the longitudinal extent L and in the direction of the transverse extent Q.

The spar cap 200 in particular has a region of reduced coverage 410 of the tiers of the second fiber composite material 400. Said region of reduced coverage 410 manifests itself in particular in that the tiers of the second fiber composite material 400 are spaced apart from the second end 220 of the spar cap 200. This spacing reduces the risk of a lightning strike in the case of the first fiber composite material having a slight electrical conductivity, or no electrical conductivity, and the second fiber composite material having a high electrical conductivity as compared to the first fiber composite material. Furthermore, the risk of a flashover in the course of the internal discharge toward the rotor blade flange is minimized on account of an installation of this type.

The schematic illustration of the spar cap 200 in FIG. 2 shows a transverse extent Q of the tiers of the first fiber composite material 300 and of the tiers of the second fiber composite material 400.

Figure 3:
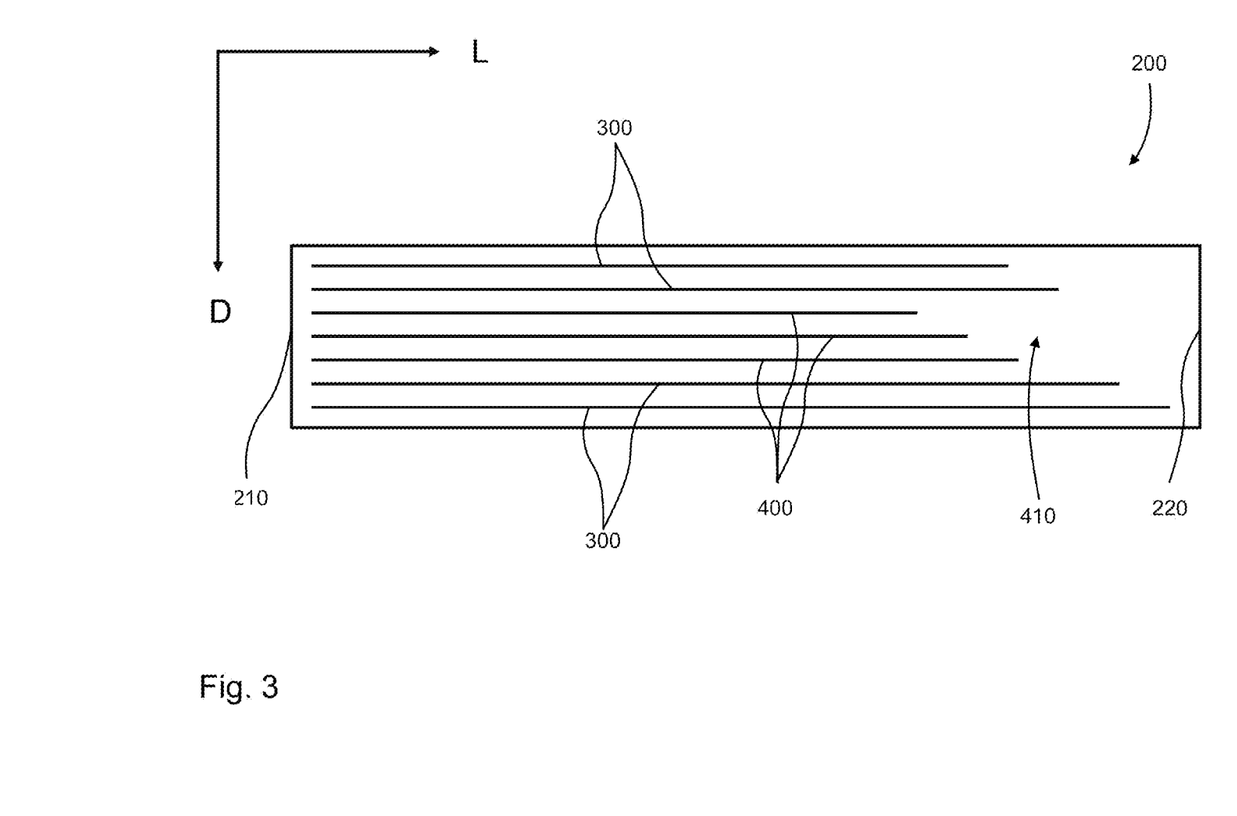
FIG. 3: shows a schematic cross-sectional view of a spar cap in the direction of a longitudinal extent and of the thickness thereof.

FIG. 3 shows a schematic cross-sectional view in the direction of a longitudinal extent L and of a thickness D of a spar cap 200. The schematically illustrated tiers and the number thereof are in particular depicted in this view. The tiers are depicted in a perspective orthogonal to the planar expanse of said tiers, and orthogonal to the longitudinal extent of said tiers. The thickness D of the spar cap is determined by the number of the tiers of the first fiber composite material 300 that are disposed on top of one another, and by the number of tiers of the second fiber composite material 400. The region of reduced coverage 410 of the tiers of the second fiber composite material 400 is likewise illustrated in this perspective.

Furthermore depicted is the longitudinal extent of the individual tiers of the first fiber composite material 300, and the longitudinal extent of the individual tiers of the second fiber composite material 400, wherein the dimensions of the respective longitudinal extent of said fiber composite materials are not identical. On account of the region of reduced coverage of the tiers of the second fiber composite material 400 rigidity jumps are created in the choice of a more rigid material for the second fiber composite material than that for the first fiber composite material. On account of the reduction in tiers of the second fiber composite material 400 at the location along the longitudinal extent L, the tiers of the first fiber composite material 300 in summary can have a higher rigidity than the tiers of the second fiber composite material 400 such that the rigidity jumps can be minimized to the largest extent.

Furthermore, on account of the reduction in the tiers of the second fiber composite material 400 of this type, the number of tiers of the first fiber composite material 300 can also be reduced toward the end 220. In turn, the spar cap 200 on account thereof, in the case of a reducing level of elongation, can be produced overall with fewer tiers disposed on top of one another toward the second end 220. A reduced number of the tiers disposed on top of one another results in a more compact construction mode, lower material costs, and an accelerated production time, and ultimately in a lower weight of the spar cap 200.

It is moreover illustrated that the tiers of the second fiber composite material 400 in the direction of the thickness are disposed between tiers of the first fiber composite material 300. It is furthermore depicted in this special exemplary embodiment that the tiers of the second fiber composite material 400 have two external, mutually opposite, sides which are in each case formed by a planar expanse of the tiers in the longitudinal direction L and transverse direction Q, wherein the same number of tiers of the first fiber composite material 300 are disposed on both external sides of the tiers of the second fiber composite material 400. As for FIG. 3, this means that preferably in each case the same number of tiers of the first fiber composite material 300 is disposed in the vertical direction, above and below the three tiers of the second fiber composite material 400.

Figure 4:
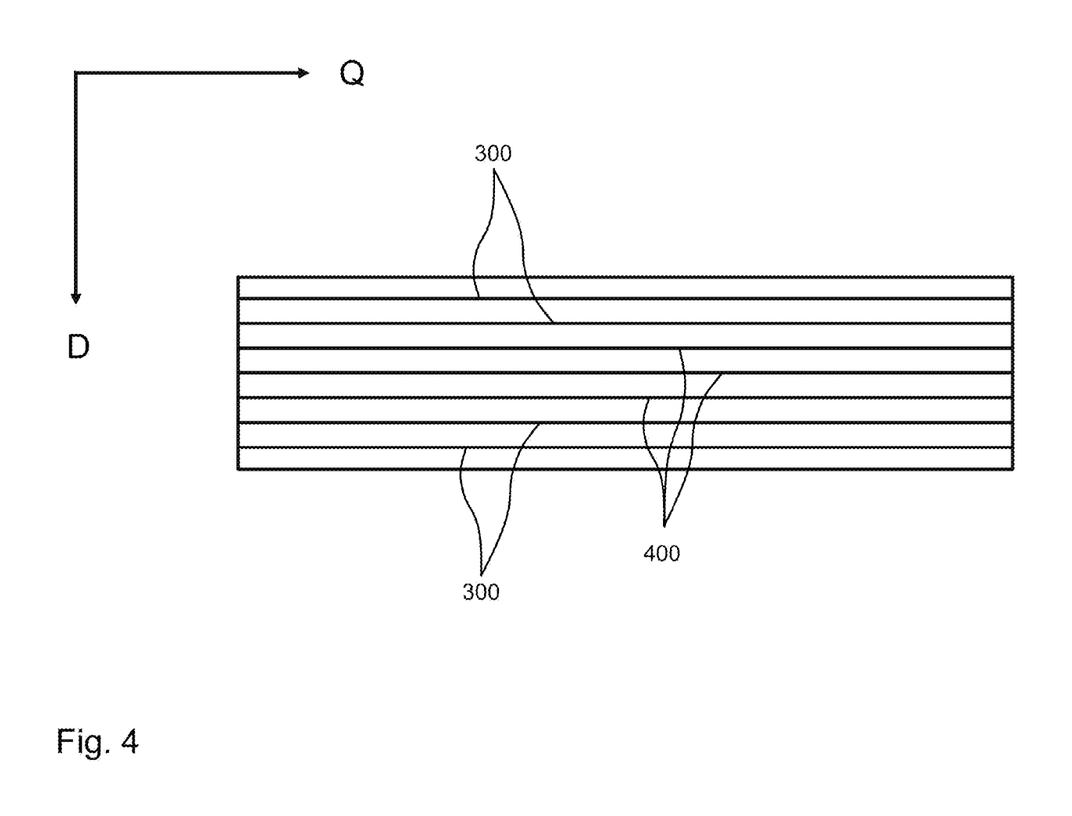
FIG. 4: shows a schematic cross-sectional view of a spar cap in the direction of a transverse extent and of a thickness thereof.

FIG. 4 shows a schematic cross-sectional view in the direction of a transverse extent Q and of a thickness D of a spar cap 200. The cross section shown is in particular from a region along the longitudinal extent L in which region the tiers of the first fiber composite material 300 and tiers of the second fiber composite material 400 are not reduced in a manner analogous to the description of FIG. 3. Therefore, three tiers of the second fiber composite material 400 are disposed in the interior, and in each case two tiers of the first fiber composite material are disposed on the planar external sides of said tiers of the second fiber composite material 400. The tiers of the first fiber composite material 300 and of the tiers of the second fiber composite material 400 furthermore preferably extend completely along the transverse extent Q.

Figure 5:
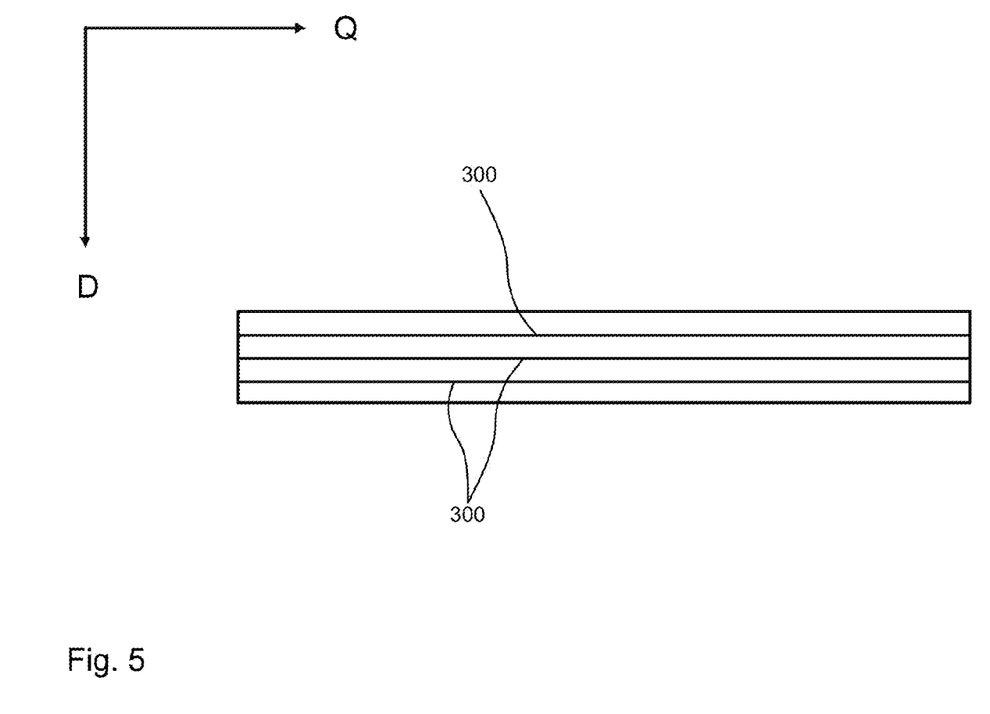
FIG. 5: shows a schematic cross-sectional view of a spar cap in the region of the reduced coverage, in the direction of a transverse extent and of a thickness of said spar cap.

FIG. 5 shows a schematic cross-sectional view in the direction of a transverse extent and of a thickness of a spar cap. The cross section shown is in particular from a region of reduced coverage 410 along the longitudinal extent L, in which region the tiers of the first fiber composite material 300 and tiers of the second fiber composite material 400 are reduced, in a manner analogous to the description of FIG. 3, since only tiers of the first fiber composite material 300 are depicted here. A region of reduced coverage 410 which, in a manner adjacent to the second end 220 and not having tiers of the second fiber composite material 400, is composed substantially of tiers of the first fiber composite material 300 or comprises the latter, is furthermore depicted.

Figure 6:
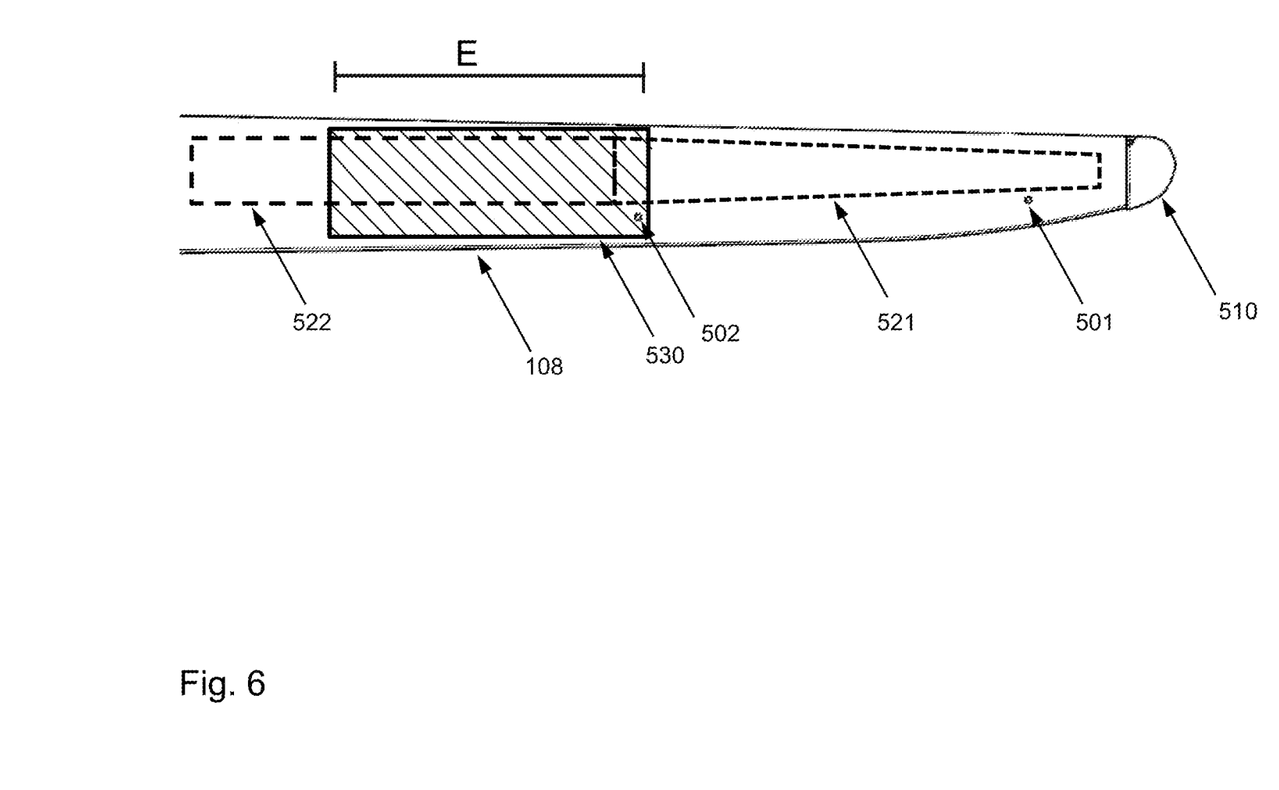
FIG. 6: shows a schematic illustration of a rotor blade according to the invention.

FIG. 6 shows a schematic illustration of a rotor blade 108 having a rotor blade tip 510 and two lightning interception installations in the form of a first and of a second receptor 501, 502, the latter being part of a lightning protection system (not illustrated in more detail). An electrically conductive foil/film tier 530 is connected in an electrically conductive manner to the second receptor 502. Said electrically conductive foil/film tier 530 does not extend across the entire longitudinal extent of the rotor blade, but has an extent E of a few meters, preferably approximately 1 to 5 m, in the direction of the longitudinal extent of the rotor blade. The foil/film tier 530 in particular covers a region in the direction of a longitudinal extent of the rotor blade in which the at least one tier of the second fiber composite material of the spar cap terminates. This region in FIG. 6 can be seen at the transition from the spar cap having the first and the second fiber composite material 522 to the spar cap having only the first fiber composite material 521. The foil/film tier 530 is furthermore preferably disposed as far out as possible in the direction transverse to the longitudinal extent of the rotor blade 108.

Figure 7:
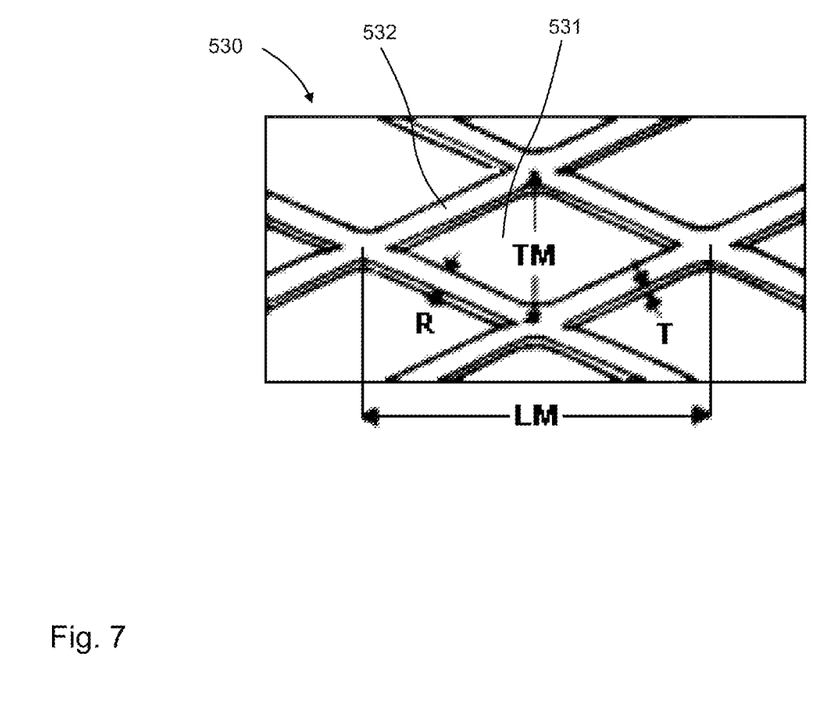
FIG. 7: shows an enlarged fragment from a schematic illustration of an electrically conductive foil/film tier of a rotor blade according to FIG. 6.

FIG. 7 shows an enlarged fragment from a schematic illustration of an electrically conductive foil/film tier 530 of a rotor blade according to FIG. 6. The foil/film tier 530 has diamond-shaped meshes 531 which are separated by webs 532. The webs 532 between the meshes 531 preferably have a thickness T of 0.3 mm and a width R of 0.5 mm. The meshes 531 preferably have a length LM of 3.5 mm and a width TM of 2.5 mm.

LIST OF REFERENCE SIGNS

100 Wind power installation
102 Tower
104 Nacelle
106 Rotor
108 Rotor blades
110 Spinner
200 Spar cap
210 First end
220 Second end
300 Tier(s) of first fiber composite material
400 Tier(s) of second fiber composite material
410 Region of reduced coverage
501, Receptors
502
510 Rotor blade tip
521 Spar cap having the first fiber composite material
522 Spar cap having the first and the second fiber composite material
530 Electrically conductive foil/film tier
531 Mesh
532 Web
L Longitudinal extent
Q Transverse extent
D Thickness
E Extent of the foil/film tier in the direction of the longitudinal extent of the rotor blade
TM Width of the mesh
LM Length of the mesh
R Width of the web
T Thickness of the web

The invention claimed is:

1. A rotor blade comprising:
a rotor blade root;
a rotor blade tip; and
a spar cap including:
a first end located at a region of the rotor blade root;
a second end located in a region of the rotor blade tip;
a longitudinal axis extending from the first end to the second end;
a transverse axis orthogonal to the longitudinal axis;
a thickness orthogonal to the longitudinal axis and to the transverse axis;
at least two tiers of a first fiber composite material comprising a matrix material and fibers; and
at least one tier of a second fiber composite material comprising a matrix material and fibers,
wherein at least one of the matrix material or the fibers of the first fiber composite material are different from the matrix material and the fibers of the second fiber composite material;
wherein the second fiber composite material is disposed in a portion adjacent to the second end in a direction of the thickness between the at least two tiers of the first fiber composite material;

wherein the at least one tier of the second fiber composite material terminates ahead of the second end, wherein the fibers of the second fiber composite material comprise carbon fibers, and the fibers of the first fiber composite material comprise inorganic fibers, wherein the number of tiers of the first fiber composite material is less at the second end than the number of tiers of the first fiber composite material at the first end, and wherein two external tiers comprising the first fiber composite material are located in a region of the rotor blade that contains a reduction in the tiers of the first fiber composite material.

2. The rotor blade as claimed in claim 1, wherein a region at the second end comprises at least one tier of the first fiber composite material.

3. The rotor blade as claimed in claim 1, comprising: at least two tiers of the second fiber composite material, wherein a number of tiers of the second fiber composite material is reduced toward the second end.

4. The rotor blade as claimed in claim 1, comprising at least one of:
at least three or more tiers of the first fiber composite material; or
at least three or more tiers of the second fiber composite material.

5. The rotor blade as claimed in claim 1, wherein the at least one tier of the second fiber composite material has two mutually opposite ends, wherein the two mutually opposite ends are formed by a planar expanse of the tiers in the longitudinal axis and the transverse axis, and wherein a same number of tiers of the first fiber composite material is disposed on both ends of the at least one tier of the second fiber composite material.

6. The rotor blade as claimed in claim 1, wherein the matrix material of at least one of: the first fiber composite material or the second fiber composite material includes an insulative material; and wherein the insulative material is at least one of: thermoplastic, thermosetting material, cement, concrete, or ceramic.

7. The rotor blade as claimed in claim 1, wherein the fibers of at least one of: the first fiber composite material or the second fiber composite material extend substantially parallel with a direction of the longitudinal axis.

8. A wind power installation comprising:
the rotor blade as claimed in claim 1; and
an electrically conductive foil/film tier and a lightning interception installation of a lightning protection system, wherein the electrically conductive foil/film tier is connected to the lightning interception installation by way of an electrically conductive connection.

9. A wind power installation comprising:
a tower;
a nacelle; and
a rotor, wherein the rotor has at least one rotor blade as claimed in claim 1.

10. A rotor blade comprising:
a spar cap including:
a first end;
a second end;
a longitudinal axis extending from the first end to the second end;
a transverse axis orthogonal to the longitudinal axis;
a thickness orthogonal to the longitudinal axis and to the transverse axis;
at least two tiers of a first fiber composite material; and
at least one tier of a second fiber composite material, wherein:
the first fiber composite material has a matrix material and/or fibers that are different from a matrix material and fibers of the second fiber composite material;
the second fiber composite material is disposed in a portion adjacent to the second end in a direction of the thickness between the at least two tiers of the first fiber composite material;
the at least one tier of the second fiber composite material terminates ahead of the second end; and
an electrically conductive foil/film tier and a lightning interception installation of a lightning protection system, wherein the electrically conductive foil/film tier is connected to the lightning interception installation by way of an electrically conductive connection,
wherein at least one of:
the foil/film tier has a longitudinal axis that extends in a direction of a longitudinal axis of the rotor blade, the longitudinal axis of foil/film tier being at most ⅕ of the longitudinal axis of the rotor blade;
the foil/film covers a region in the direction of the longitudinal axis of the rotor blade in which the at least one tier of the second fiber composite material terminates;
the foil/film tier is disposed in an external half of a thickness of a rotor blade wall that is measured transversely longitudinal direction of the rotor blade;
the foil/film tier is disposed on one or a plurality of tiers of fiber composite material that do not provide structure support for the rotor blade;
the foil/film tier is disposed and configured for resisting an expected lightning current load; or
the foil/film tier has a plurality of clearances and/or meshes.

11. A method for producing a rotor blade as claimed in claim 1, the method comprising:
stacking the at least two tiers of the first fiber composite material; and
stacking the at least one tier of the second fiber composite material.

12. The method as claimed in claim 11, wherein the number of tiers of the first fiber composite material is reduced toward the second end.

13. The method as claimed in claim 11, wherein at least two tiers of the second fiber composite material are laid up in such a manner that the number of tiers of the second fiber composite material is reduced toward the second end.

14. The method as claimed in claim 11, further comprising:
incorporating an electrically conductive foil/film tier and connecting the foil/film tier to a lightning interception installation of a lightning protection system by way of an electrically conductive connection.

* * * * *